May 5, 1936.  H. KÜPPENBENDER  2,040,050
COMBINED PHOTOGRAPHIC CAMERA AND DISTANCE METER
Filed May 25, 1934   3 Sheets-Sheet 1

Inventor:
H. Küppenbender
by: Hans Hederich
Attorney.

May 5, 1936.  H. KÜPPENBENDER  2,040,050
COMBINED PHOTOGRAPHIC CAMERA AND DISTANCE METER
Filed May 25, 1934   3 Sheets-Sheet 2

Inventor:
H. Küppenbender
by:
Hans Hederich
Attorney.

May 5, 1936.   H. KÜPPENBENDER   2,040,050
COMBINED PHOTOGRAPHIC CAMERA AND DISTANCE METER
Filed May 25, 1934   3 Sheets-Sheet 3
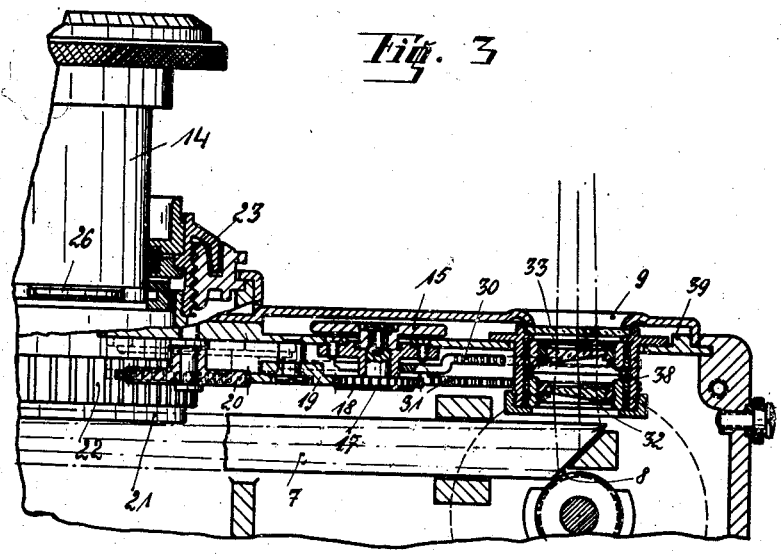
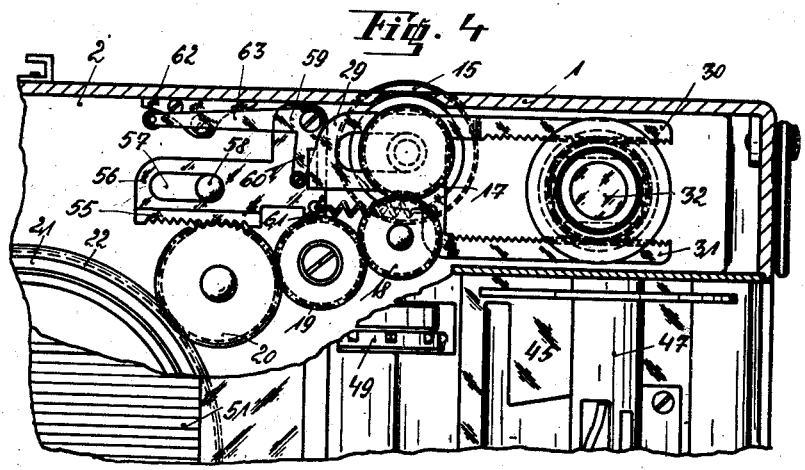
Inventor:
H. Küppenbender
by: *[signature]*
Attorney.

Patented May 5, 1936

2,040,050

UNITED STATES PATENT OFFICE 2,040,050

COMBINED PHOTOGRAPHIC CAMERA AND DISTANCE METER

Heinz Küppenbender, Dresden, Germany, assignor to Zeiss Ikon Aktiengesellschaft Dresden, Dresden, Germany Application May 25, 1934, Serial No. 727,490
In Germany May 30, 1933

12 Claims. (Cl. 95—44)

This invention relates to a combined photographic camera and distance meter in which this latter is coupled with the means for adjusting the objective. Hitherto, mirror or prism systems were turnable in an axis standing perpendicularly with respect to the measuring plane. Furthermore, distance meters have become known in which lens systems can be shifted towards one another and parallel to the basis.

Those known devices suffer from the drawback that the transmission means used must be extraordinarily accurate. When deflecting the measuring rays by rotatory mirrors or prisms the rotary motion must be carried out with double the accuracy, that is to say, with one half of the allowances, that had been admitted for the measuring ray. These accuracies had to be just so observed for the adjustment of the distance, as well as for the compensation of the differences of height. Similar difficulties are encountered when lens systems are shifted towards one another according to the above-mentioned procedure.

In order to obviate said difficulties there is, according to this invention, a distance meter united with the photographic camera and coupled with the adjustment means for the objective, that distance meter being designed as a basis distance meter with stationary mirrors or prisms and the deflection of the measuring rays being effected by means of two glass wedges that are rotatable counter to one another. The dimensions of said wedges are such that the rays are deflected only in one direction, viz. in that of the measuring plane, when the wedges are moved, whereas the wedge deflections in all other directions compensate one another. The measuring wedges can be actuated by a variety of means. Most suited for the purpose in view is it to employ the worm thread mounting of the objective as actuating means, or, if the objective is provided with an adjustable front lens to effect the operation of the wedges from this place.

Figure 1:
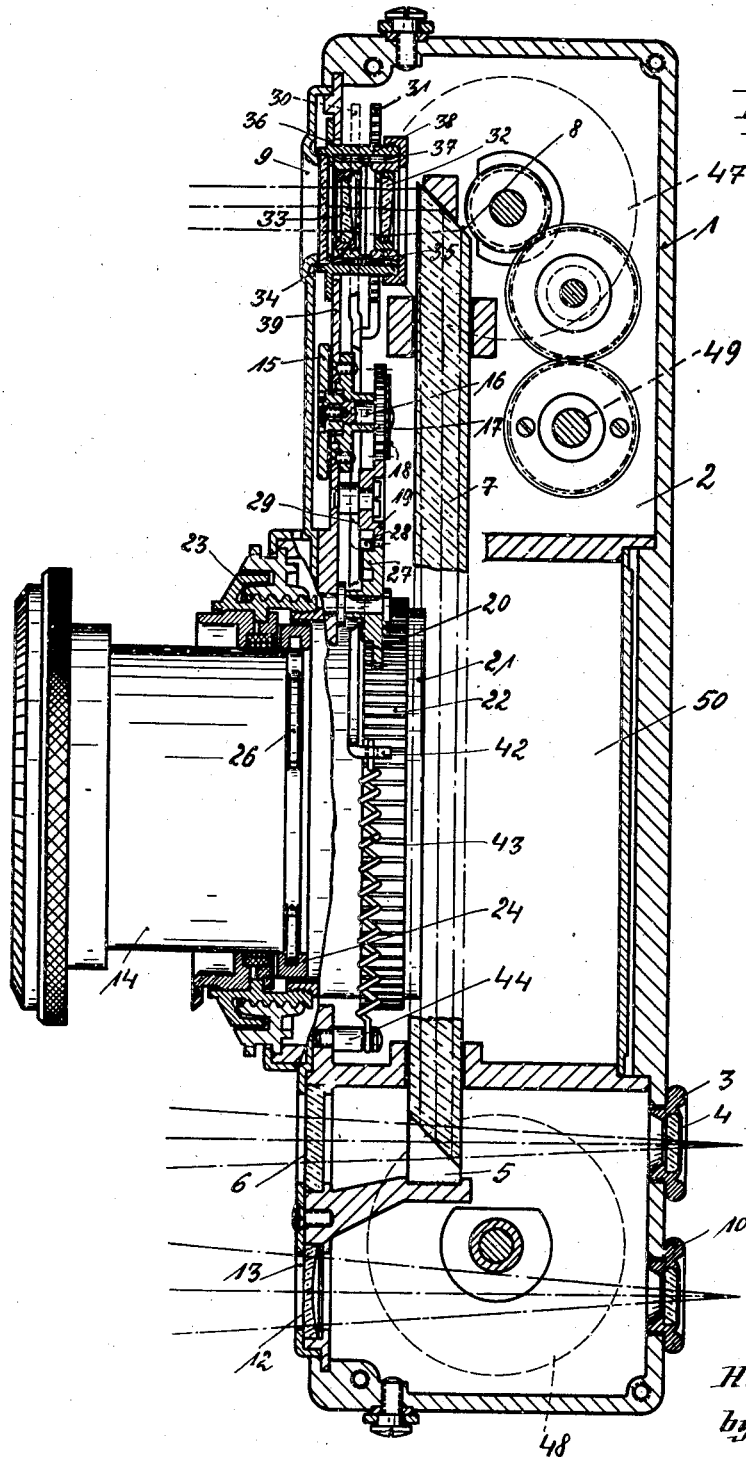
Figure 2:
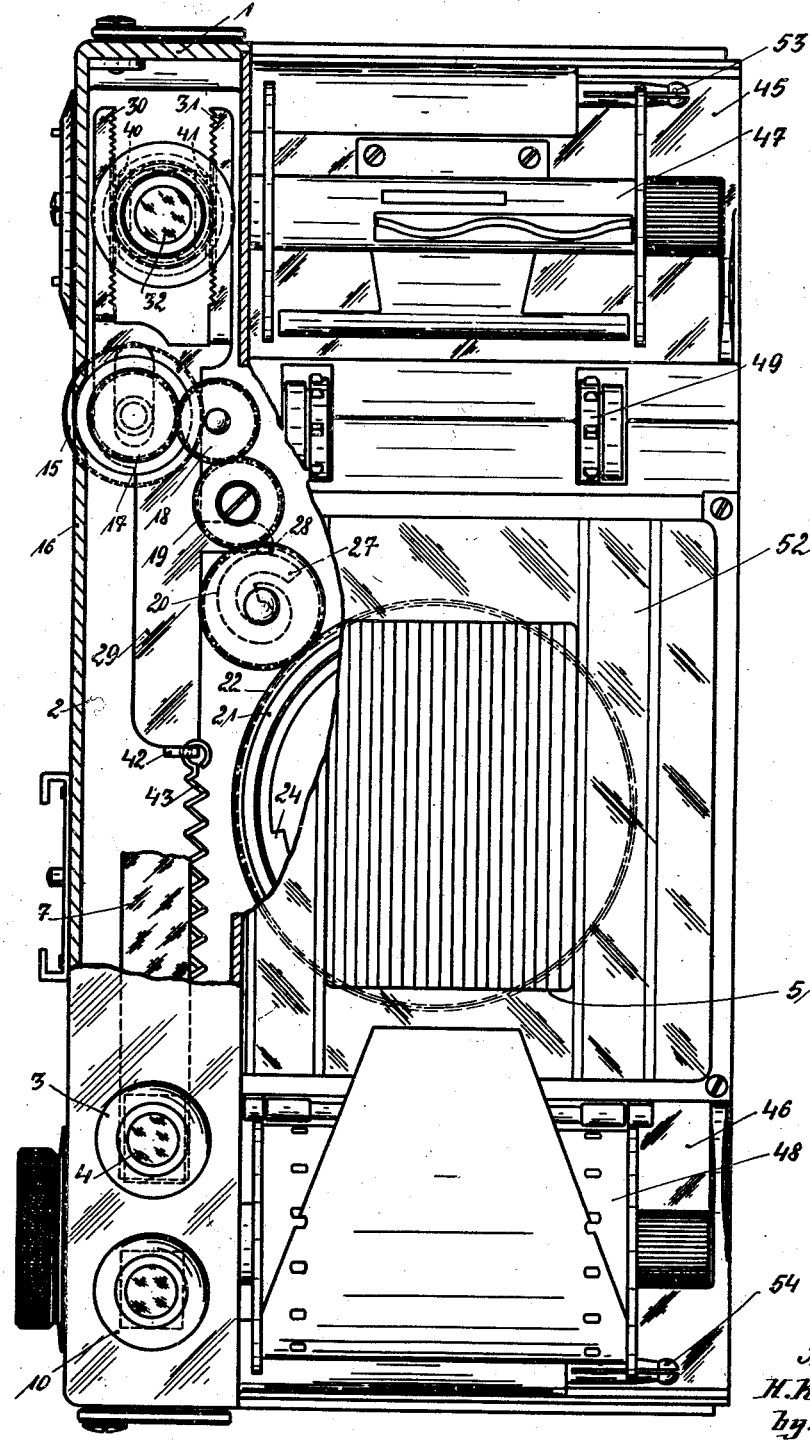

The invention is illustrated diagrammatically and by way of example on the accompanying drawings, on which Figure 1 is a vertical section through a combined photographic camera and distance meter designed according to this invention, the objective being shown in side-view. Figure 2 is partly also a vertical section through the combined camera and distance meter and partly a rear-view of the same, a portion of the rear wall being broken away. Figs. 3 and 4 show a modification of these figures. Fig. 3 is a view similar to Fig. 1, showing, however, only the lefthand portion of the upper half of said figure, certain members being shown in another position, and Fig. 4 is a view similar to Fig. 2, showing, however, likewise only the lefthand portion of the upper half of this figure, certain members being again shown in another position.

The wedge distance measuring device is housed in the upper portion of the camera casing 1 in the separate chamber 2 (Fig. 1). 3 (Figs. 1 and 2) is the aperture for looking into the distance meter, and 4 is a small disk of glass inserted into said aperture. The pencil of rays projecting forth from the objective plane passes through an opening 6 to a semi-gilded or semi-silvered prism 5 joining the basis prism 7. The object at which aim is taken can be viewed through the aperture 4. The measuring ray which enters into the apparatus through an aperture 9 impinges first upon the glass wedges 32 and 33 and then upon a prism surface 8 which may be reflecting, if desired, and then said ray is there deflected by 90°, from where it passes through the basis prism 7 to the prism surface 5 where the object at which aim has been taken is likewise visible, but displaced with respect to the first image. In order to make the two images that are visible upon the prism surface cover one another, the measuring ray must be deflected which is effected by the glass wedges 32, 33. When this has been done, so that the two images cover one another, the objective has been adjusted to the correct distance of the object concerned.

At a side of the viewing aperture 3 of the distance meter is the viewing aperture of the searcher with which aperture the image cut-out is ascertained. The viewing aperture of the searcher is formed by an ocular mounting 10 (Figs. 1 and 2). The searcher lens 12 is located opposite the mounting 10 in an aperture 13. This arrangement presents the advantage that the operator, after having looked at the image field, can proceed at once to the adjustment of the distance.

In order to render it possible to measure distances from infinite to the immediate neighbourhood of the operator it is, as has already been mentioned, necessary to deflect the measuring ray; this is rendered possible by the rotatory wedges 32, 33.

The re-adjustment of the objective 14 is effected by means of a manually operable adjustment wheel 15 which projects forth through the wall of the camera 1 at the upper side 16 of the same. The motion imparted to the wheel 15 is transmitted to a cog-wheel 17 affixed to the axle 16 of said wheel 15. The objective branch is provided with teeth 21 around its circumference, and intermediate cog-wheels 18, 19, 20 transmit the rotary motion from the wheel 17 to said teeth 21 and, thus, to the objective.

The objective branch 21 is, furthermore, provided with a worm thread 23, by means of which the branch, or the objective respectively, can be moved forwardly and rearwardly, and there is at said branch also a bayonet mounting 24 into which the bayonet 26 of the objective 14 can be inserted. The intermediate wheel is equipped with a curved cam 27 upon which slides a projection 28 of a sliding bar 29 having two upwardly directed arms 30 and 31 which are designed as racks, the teeth of which are directed towards one another and which constitute the means for turning the glass wedges in opposite directions. Each of these wedges is supported in a mounting 34, or 35 respectively, which is provided with a toothing 36, or 37 respectively, that meshes with said racks 30, 31. The mountings 34, 35 are supported in a sleeve 38 attached to a wall 39 of the camera casing 1. This sleeve has two recesses 40 and 41 through which the racks extend so as to be able to engage the teeth of the glass wedge mountings 34, 35. At the rear end of the sliding bar 29 is an eye 42 (Fig. 2) to which is attached a helical tensile spring 43, the other end of which is affixed to a pin 44 (Fig. 1).

Below the chamber 2 of the distance measuring device are chambers 45 and 46 for the reception of the film spools 47, 48 and of the toothed film feeding roll 49, and there is, furthermore, the light-channel 50 with the image gate 51 and the film guide surface 52. Instead of film spools cases may be used which then are attached to elastic pins 53, 54 located at the top and the bottom of the casing, as shown in Fig. 2.

While in Figs. 1 and 2 the curved cam requisite for the compensation of the movement of the objective relatively to the movement of the wedges 32, 33 deflecting the measuring ray is formed by the curved cam 27 which imparts to the sliding bar 29 with its racks 30, 31 the movements necessary for moving the glass wedges. Figs. 3 and 4 show another constructional form in which the means for re-adjusting the glass-wedges are coupled with the means for moving the objective.

The rotary motion imparted to the adjusting wheel 15 is also in this case, as in Figs. 1 and 2, transmitted to the teeth 22 provided at the objective branch 21, and thus to the objective, by the intermediary of the cog-wheels 17, 18, 19 and 20. The wheel 20 is moved by means of a longitudinally movable member 56 provided with a toothing 55 engaging said wheel 20, as well as with an oblong opening 57 which is engaged by a stationary pin 58 guiding said member 56. To this latter is pivoted a bell-crank lever 59, the shorter arm 60 of which transmits the longitudinal movement of the toothed member 56 to a likewise longitudinally sliding bar 29 from which project forth the racks 30 and 31. The members 56 and 29 are connected with one another by a helical tensile spring 61. The action of this spring consists in drawing the sliding bar 29 against the arm 60 of said bell-crank lever. The compensation movement which the measuring wedges must be given relatively to the objective 14 is effected by means of a stationary cam 62 provided in the chamber 2 and acting upon the longer arm 63 of the bell-crank lever whereby the shorter arm 60 is caused to move the sliding bar 29 with its racks 30, 31, and these racks turn the glass wedges in the one or the other direction.

I claim:

1. In combination with a photographic camera a distance meter located in the casing of same, means adapted to produce a measuring ray, two glass wedges located one behind the other in a separate chamber of said camera casing and adapted to reflect said ray, and means adapted to rotate said wedges in opposite directions without changing the distance between said wedges.

2. In combination with a photographic camera having a casing and a separate chamber in said casing and with an objective, a distance meter located in said camera casing, means in said separate chamber adapted to produce a measuring ray, two glass wedges located one behind the other in said separate chamber behind said ray producing means and adapted to deflect said ray, a mounting carrying said objective on said casing and having a worm thread, and means between said mounting and said wedges adapted to transmit the motion from said mounting to said wedges.

3. In combination with a photographic camera having a casing and a separate chamber in said casing, an objective, a movable front lens on said objective, a distance meter located in said camera casing, means for producing a measuring ray, two glass wedges located one behind the other in said separate chamber behind said ray producing means and adapted to deflect said ray, and means between said lens and said wedges for transmitting motion from said lens to said wedges.

4. In combination with a photographic camera having a casing with a slot in its front wall and a separate chamber in said casing, an adjustable objective forming part of said camera, a distance meter located in said camera casing, means for producing a measuring ray, two glass wedges arranged one behind the other in said separate chamber behind said ray producing means and adapted to deflect said ray, a mounting on said casing carrying said objective and having a worm thread, means cooperating with said worm thread to transmit motion from said mounting to said wedges, and a manually operable adjustment wheel projecting through the slot in said casing, and means for transmitting motion from said adjustment wheel to said objective.

5. In combination with a photographic camera having a casing with a slot in its front wall and a separate chamber in said casing, an adjustable objective forming part of said camera, a distance meter located in said camera casing, means for producing a measuring ray, two glass wedges arranged one behind the other in said separate chamber behind said ray producing means and adapted to deflect said ray, a mounting on said casing carrying said objective and having a worm thread, means cooperating with said worm thread to transmit motion from said mounting to said wedges, and a manually operable adjustment wheel projecting through the slot in said casing, a toothed rim on the inner end of said mounting and intermediate cog-wheels between said rim and said adjustment wheel adapted to transmit motion from said adjustment wheel to said mounting.

6. In combination with a photographic camera having a casing with a slot in its front wall and a separate chamber in said casing, an adjustable objective forming part of said camera, a distance meter located in said camera casing, means for producing a measuring ray, two glass wedges arranged one behind the other in said separate chamber behind said ray producing means and adapted to deflect said ray, a mounting on said casing carrying said objective and having a worm thread, means cooperating with said worm thread to transmit motion from said mounting to said wedges, and a manually operable adjustment wheel projecting through the slot in said casing, a toothed rim on the inner end of said mounting, intermediate cog wheels between said rim and said adjustment wheel, a curved cam on one of said intermediate cog wheels, a slidable bar bearing against said cam, two racks with oppositely directed teeth projecting from said lever and coupled with said wedges and adapted to rotate said wedges in opposite directions.

7. In combination with the photographic camera specied in claim 6, a lug on the lever, and a spring holding said lug in contact with said cam.

8. In combination with the photographic camera specied in claim 6, toothed mountings for said wedges, the teeth of said mountings meshing with said racks.

9. In combination with the photographic camera specified in claim 6, toothed mountings for said wedges, a casing enclosing said mountings and having apertures so located as to allow of said racks engaging the teeth of the mountings.

10. In combination with the photographic camera specified in claim 6, a longitudinally movable toothed sliding bar meshing with one of the intermediate transmission wheels, a bell-crank lever pivoted to said sliding bar, another sliding bar so located relatively to said lever as to be adapted to be shifted by the shorter arm of the same, said last mentioned sliding bar forming the racks actuating the glass-wedges, substantially as set forth.

11. In combination with the photographic camera specified in claim 6, a longitudinally movable toothed sliding bar meshing with one of the intermediate transmission wheels, a bell-crank lever pivoted to said sliding bar, another sliding bar so located relatively to said lever as to be adapted to be shifted by the shorter arm of the same, said last mentioned sliding bar forming the racks actuating the glass-wedges, a stationary cam arranged relatively to the longer arm of the bell-crank lever so that it is adapted to turn this lever when it is shifted by the first of the two sliding bars, substantially as set forth.

12. In combination with the photographic camera specified in claim 6, a longitudinally movable toothed sliding bar meshing with one of the intermediate transmission wheels, a bell-crank lever pivoted to said sliding bar, another sliding bar so located relatively to said lever as to be adapted to be shifted by the shorter arm of the same, said last mentioned sliding bar forming the racks actuating the glass-wedges, a stationary cam arranged relatively to the longer arm of the bell-crank lever so that it is adapted to turn this lever when it is shifted by the first of the two sliding bars, and a tensile spring interconnecting the two sliding bars.

HEINZ KÜPPENBENDER.